United States Patent
Kolda

(10) Patent No.: US 6,974,147 B1
(45) Date of Patent: Dec. 13, 2005

(54) INTERNAL TIGHTENING SYSTEM FOR PREVENTING RELATIVE MOVEMENT BETWEEN A PAIR OF INTERCONNECTED MEMBERS

(75) Inventor: Clint D. Kolda, Cottage Grove, WI (US)

(73) Assignee: Saris Cycling Group, Inc., Madison, WI (US)

( * ) Notice: Subject to any disclaimer, the term of this patent is extended or adjusted under 35 U.S.C. 154(b) by 0 days.

(21) Appl. No.: 10/679,739

(22) Filed: Oct. 6, 2003

(51) Int. Cl.$^7$ ................................................ B60D 1/28
(52) U.S. Cl. ...................... 280/506; 280/507; 403/370; 403/374.3; 292/240
(58) Field of Search ............................... 403/367, 368, 403/370, 374.1, 374.3; 280/506, 507; 224/517, 224/519, 522; 292/49, 197, 240, 241

(56) References Cited

U.S. PATENT DOCUMENTS

| | | | |
|---|---|---|---|
| 4,676,414 A | 6/1987 | Deguevara | |
| 5,067,641 A | 11/1991 | Johnson et al. | |
| 5,190,195 A | 3/1993 | Fullhart et al. | |
| 5,244,133 A | 9/1993 | Abbott et al. | ................ 224/521 |
| 5,323,915 A | 6/1994 | Fortune, Sr. et al. | |
| 5,333,888 A * | 8/1994 | Ball | ........................... 280/504 |
| 5,344,175 A | 9/1994 | Speer | |
| 5,372,287 A | 12/1994 | Deguevara | |
| 5,423,566 A | 6/1995 | Warrington et al. | ..... 280/415.1 |
| 5,449,101 A | 9/1995 | Van Dusen | |
| 5,573,165 A | 11/1996 | Bloemer et al. | |
| 5,593,172 A | 1/1997 | Breslin | |

(Continued)

Primary Examiner—Paul N. Dickson
Assistant Examiner—Daniel Yeagley
(74) Attorney, Agent, or Firm—Boyle, Fredrickson, Newholm, Stein & Gratz, S.C.

(57) ABSTRACT

A system for preventing relative movement between first and second members, in which the first member is received within a passage defined by the second member. The system includes an engagement or locking member, which may in the form of a cam, that is movably mounted within an interior defined by the first member. An actuator arrangement is carried by the first member and is interconnected with the cam, for moving the cam between an operative position and a release position. In one embodiment, the first member may be in the form of a mounting member associated with a device such as a trailer tow bar or the mounting member of an equipment carrier, and the second member may be in the form of a hitch receiver secured to a vehicle. A cross member is located within the interior of the first member, and may be in the form of a hitch pin that extends through aligned openings in the first and second members. The cam bears against the cross member, and is configured such that movement of the cam from the release position to the operative position, in response to operation of the actuator arrangement, causes the cam to move laterally through an opening in the first member into engagement with an internal surface defined by the second member. In this manner, the cam applies a lateral force that urges the first member laterally into engagement with an internal surface defined by the second member. The actuator arrangement may be in the form of a rotatable knob secured to the first member, which is interconnected with an actuator rod that moves axially in response to rotation of the rotatable knob so as to cause pivoting movement of the cam between the operative position and the release position.

36 Claims, 4 Drawing Sheets

U.S. PATENT DOCUMENTS

| | | |
|---|---|---|
| 5,615,904 A | 4/1997 | Van Dusen et al. |
| 5,685,686 A * | 11/1997 | Burns .................. 414/462 |
| 5,690,260 A | 11/1997 | Aikins et al. ........... 224/505 |
| 5,730,456 A * | 3/1998 | Bowers ................. 280/507 |
| 5,735,539 A | 4/1998 | Kravitz |
| 5,826,767 A | 10/1998 | Chimenti et al. |
| D401,195 S | 11/1998 | Chimenti |
| 5,845,831 A | 12/1998 | Nusbaum et al. |
| 5,857,602 A | 1/1999 | Depot |
| 5,931,362 A | 8/1999 | Chimenti |
| 6,000,594 A | 12/1999 | Chimenti |
| 6,010,144 A | 1/2000 | Breslin |
| 6,123,498 A | 9/2000 | Surkin |
| 6,164,508 A | 12/2000 | van Veenen |
| 6,336,580 B1 | 1/2002 | Allen et al. |
| 6,406,051 B1 | 6/2002 | Phillips ................ 280/506 |
| 6,598,897 B1 * | 7/2003 | Patti .................... 280/507 |
| 6,688,804 B1 | 2/2004 | Parent |

* cited by examiner

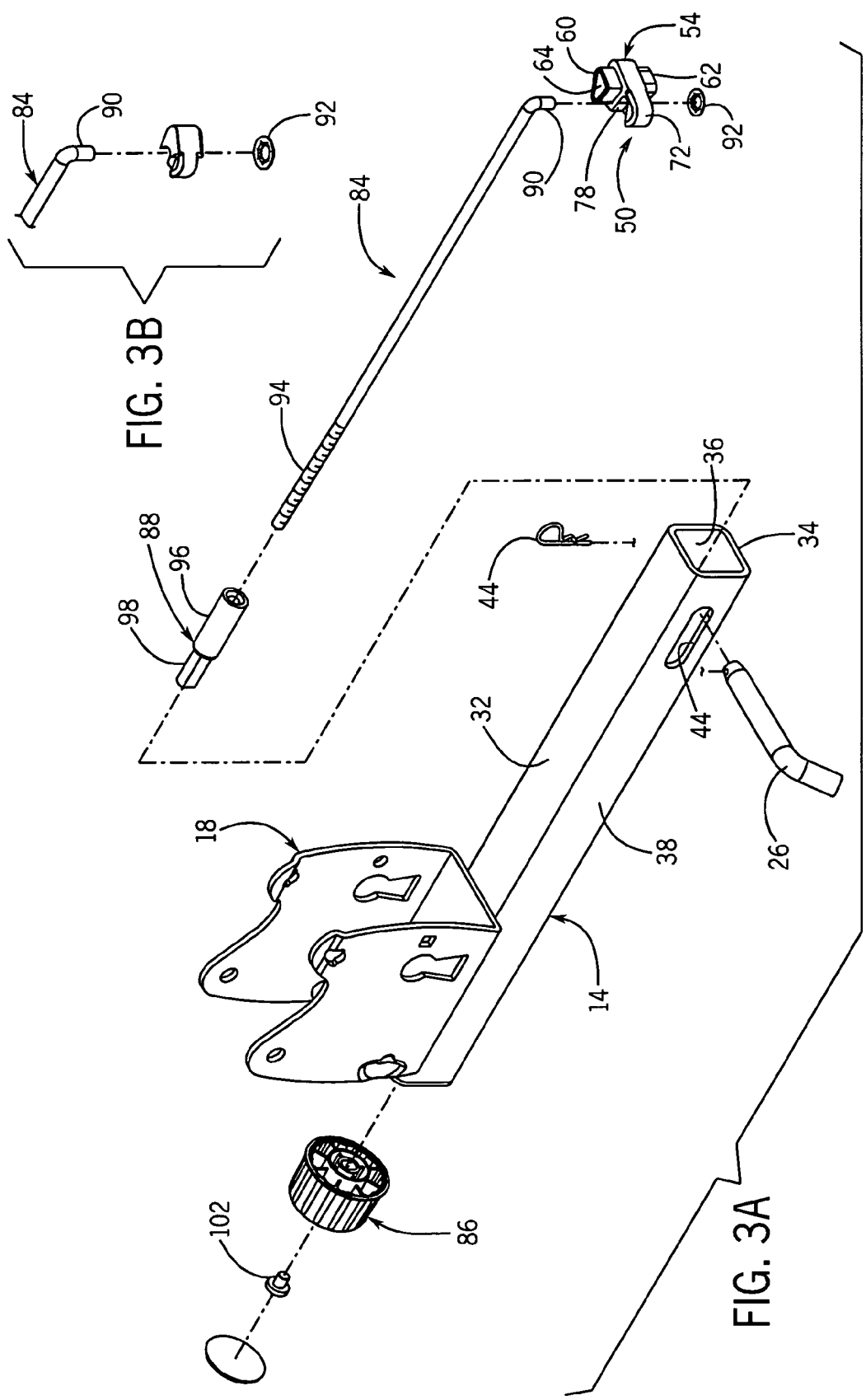

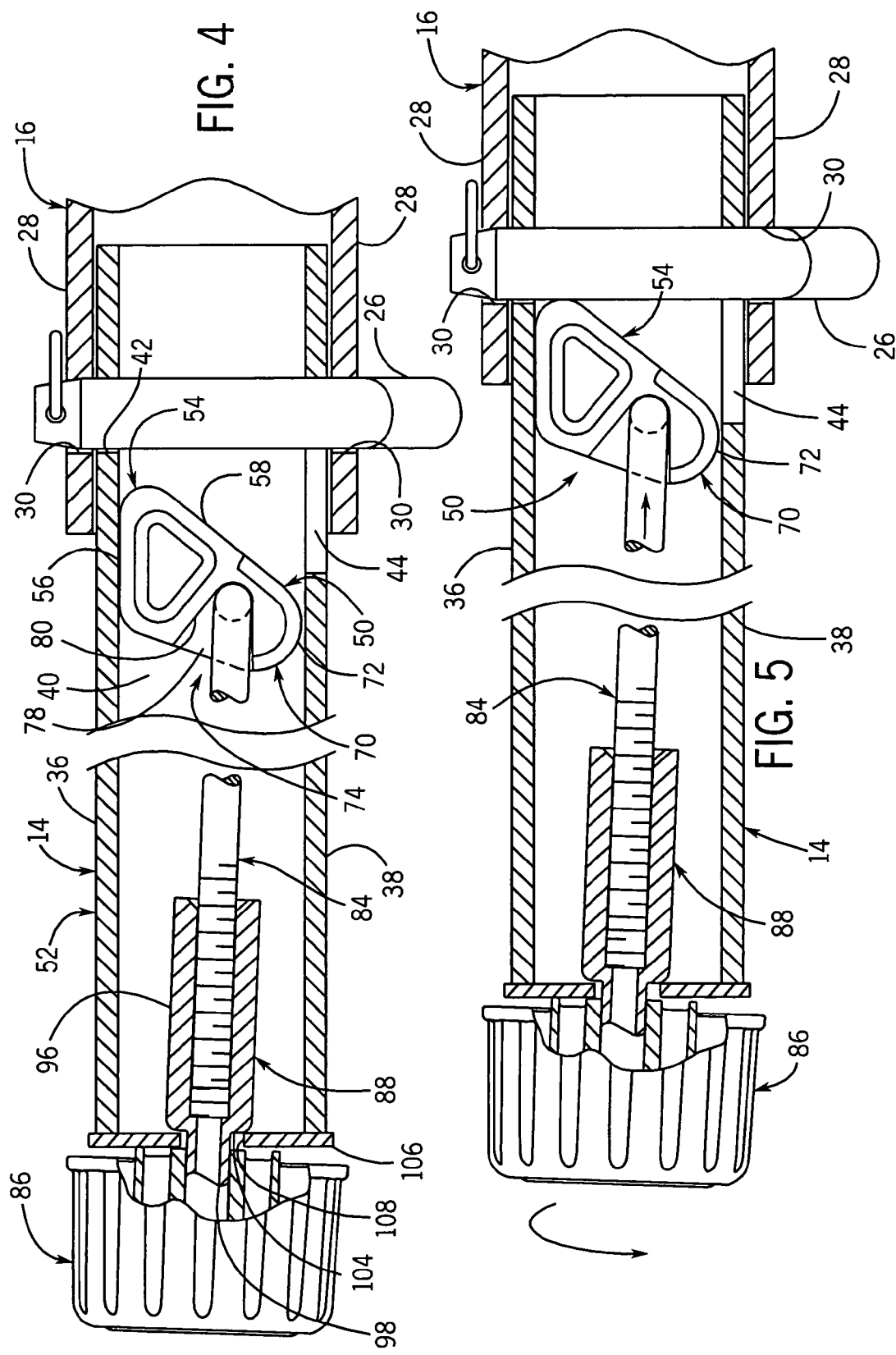

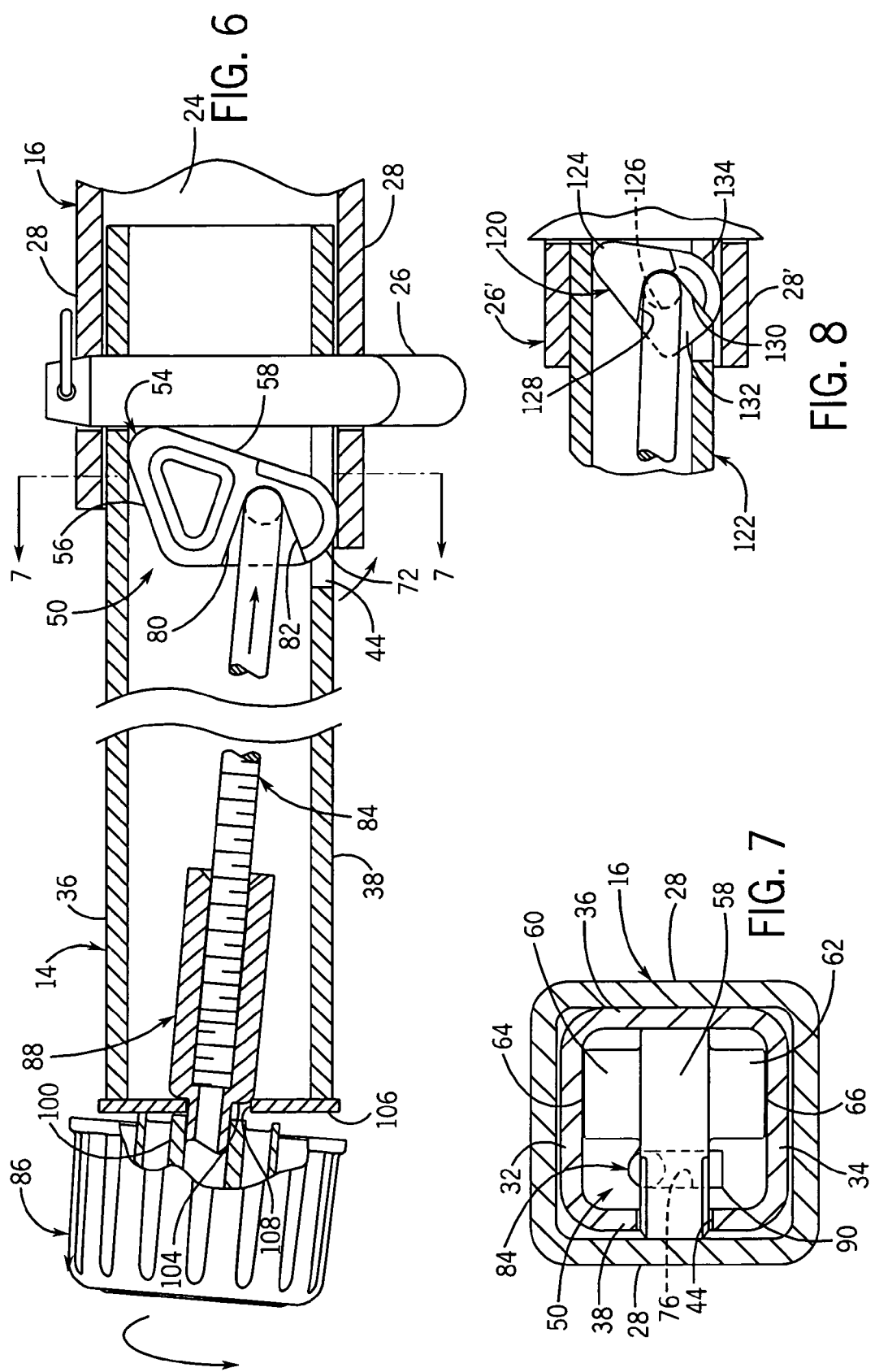

US 6,974,147 B1

INTERNAL TIGHTENING SYSTEM FOR PREVENTING RELATIVE MOVEMENT BETWEEN A PAIR OF INTERCONNECTED MEMBERS

BACKGROUND AND SUMMARY OF THE INVENTION

This invention relates to a system for preventing movement between a pair of members, and more particularly to a system for preventing movement of a first member, e.g. a mounting member associated with a hitch-mounted device such as a trailer or an equipment carrier, relative to a second member that defines a passage within which the first member is received, e.g. a vehicle-mounted hitch receiver.

Vehicle-mounted hitch receivers are commonly employed to secure a device, such as a trailer or equipment carrier, to a vehicle. In a typical construction, the hitch receiver defines a rearwardly open passage within which a mounting member of the device is received. The hitch receiver and the mounting member include openings which are placed into alignment when the mounting member is received within the passage of the hitch receiver. A cross member, such as a hitch pin, is engaged through the aligned openings to prevent axial movement of the mounting member relative to the hitch receiver.

The hitch receiver and the mounting member typically have a tubular construction, with the outside dimensions of the mounting member being slightly smaller than the inside dimensions of the hitch receiver so as to enable the mounting member to be engaged within the hitch receiver passage. Due to manufacturing tolerances and other variables, it is common for spaces or gaps to exist between the outer surfaces of the mounting member and the facing inner surfaces of the hitch receiver, which typically cause the mounting member to move and rattle relative to the hitch receiver during movement of the vehicle. Such movement of the mounting member is transferred to the device supported by the mounting member, which may be an equipment carrier, trailer, etc., and results in vibrations and forces applied to the load carried by the device which detract from performance and ultimately can reduce the life of the device. A typical solution to this problem is to provide a shim that fits between the mounting member and the hitch receiver. Alternatively, the mounting member may include a threaded receiver, and a threaded bolt extends through an opening in the hitch receiver into engagement with the threaded receiver of the mounting member for drawing the mounting member tight against the hitch receiver. While these solutions function satisfactorily to reduce or eliminate movement between the mounting member and the hitch receiver, each solution involves loose parts that can be misplaced. Further, the provision of a threaded bolt requires use of a wrench or other tool to tighten the bolt so as to ensure that the mounting member is secured in position relative to the hitch receiver.

It is an object of the present invention to provide a system for preventing relative movement between a pair of members, such as a vehicle-mounted hitch receiver and a mounting member associated with a device such as a trailer, equipment carrier, etc., in which there are no parts separate from the device that are required for preventing movement between the members. It is a further object of the invention to provide such a system which eliminates the need for a separate tool to secure the members together in a manner that prevents relative movement between the members. Yet another object of the invention is to provide such a system in which the components that are employed to secure the members together are carried by the mounting member of the device, to enable the mounting member to be engaged with a conventional hitch receiver without modification or alteration in the construction of the hitch receiver. Yet another object of the invention is to provide such a system which takes advantage of the presence of a cross member, such as a hitch pin, to apply a transverse force to the mounting member that prevents relative movement between the mounting member and the hitch receiver. A still further object of the invention is to provide such a system which is relatively simple in its components and construction, which can easily be incorporated into a hitch-mounted device, and which can be easily operated by a user to prevent relative movement between the mounting member and the hitch receiver.

In one aspect, the invention contemplates a system for preventing movement of a first member relative to a second member, wherein the first member is received within a passage defined by the second member. In one embodiment, the second member may be in the form of a vehicle-mounted hitch receiver, and the first member may be in the form of a mounting member associated with a device adapted to be towed or carried by the vehicle, such as a trailer, bicycle rack, ski carrier, etc. A transverse member, such as a hitch pin, is located within an interior defined by the first member, and may be configured to extend through aligned openings in the first and second members so as to prevent axial movement between the first and second members. An engagement member is movably mounted within the interior of the first member, and includes a first area that bears against the transverse member. An actuator is interconnected with the engagement member, and is arranged to provide movement of the engagement member between an engaged position and a release position. In the engaged position, the engagement member is positioned such that a second area of the engagement member, which is spaced from the first area, is moved through an opening in the first member into engagement with an internal surface defined by the second member. Such transverse movement of the second area of the engagement member is operable to apply a transverse force to the first member in an opposite direction due to engagement of the first area of the engagement member with the transverse member. In this manner, the force applied to the first member urges the first member against the second member, to prevent relative movement between the first and second members and also to tighten the transverse member, such as the hitch pin, into engagement with the first and second members to prevent movement of rattling of the transverse member.

The engagement member and the actuator are both carried by the first member, to eliminate the need for separate parts or tools. In one embodiment, the engagement member is in the form of a cam member positioned within the interior of the first member so as to be located adjacent the transverse member when the first member is received within the passage of the second member. The actuator may be in the form of a manually operable knob or the like that is mounted to the first member and is accessible from the exterior of the first member, in combination with an actuator member that extends between the manually operable knob and the cam member. With this construction, rotation of the knob results in axial movement of the actuator member, which is interconnected with the cam member such that movement of the actuator member causes movement of the cam member between the operative and inoperative positions.

The invention contemplates a system for preventing relative movement between first and second members, as summarized above, as well as a method of preventing movement between first and second members, also substantially in accordance with the foregoing summary. The invention further contemplates a system for tightening a mounting member to a vehicle-mounted hitch receiver and an improvement in hitch-mounted equipment, also in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3a is an exploded isometric view showing the components incorporated in a first embodiment of the internal tightening system of the present invention for preventing relative movement between the mounting member and the hitch receiver;

FIG. 3b is a partial exploded isometric view showing an alternative configuration of a cam member forming a part of the internal tightening system of the present invention for preventing relative movement between the mounting member and the hitch receiver;

FIG. 4 is a partial second view taken along line 4—4 of FIG. 2, showing the internal tightening system of the present invention in a disengaged position;

FIG. 5 is a view similar to FIG. 4, showing movement of the internal tightening system of the present invention from the release position of FIG. 4 toward an engaged position;

FIG. 6 is a view similar to FIGS. 4 and 5, showing the internal tightening system of the present invention in an engaged position;

FIG. 7 is a section view taken along line 7—7 of FIG. 6; and

FIG. 8 is an enlarged partial section view showing the cam member of FIG. 3b in an engaged position.

DETAILED DESCRIPTION OF THE INVENTION

Figure 1:
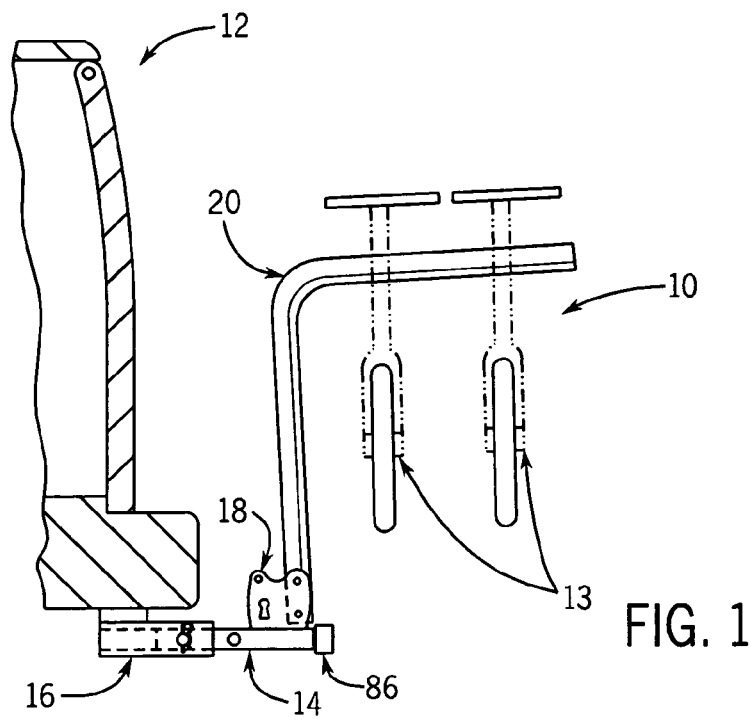
FIG. 1 is an elevation view of a representative application of the present invention, in the form of a vehicle-mounted hitch receiver adapted to mount an equipment carrier to the vehicle, in which the equipment carrier includes a mounting member adapted to be received within a passage defined by the hitch receiver.

FIG. 1 illustrates a device, in the form of an equipment carrier 10, adapted for securement to a vehicle 12 for supporting equipment on vehicle 12. In the illustrated embodiment, equipment carrier 10 is in the form of a bicycle rack, although it is understood that equipment carrier 10 may be any type of device that is configured to be secured to a vehicle for carrying equipment. Equipment carrier 10 is secured to vehicle 12 by engagement of a mounting member 14, which forms a part of equipment carrier 10, within a passage defined by a hitch receiver 16 that is mounted to vehicle 12 in a conventional manner.

In the illustrated embodiment, equipment carrier 10 includes a mounting bracket 18 to which an inverted L-shaped support member 20 is secured in a known manner. Support member 20 is configured to support equipment such as one or more bicycles B. Representatively, equipment carrier 10 may be a bicycle rack such as is available from the Saris Division of Graber Products, Inc. of Madison, Wis. under its designation BAT or T-RAX, although it is understood that the equipment carrier that is engaged with hitch receiver 16 may take any other form and may be adapted to support any other type of equipment. The illustrated embodiment is understood to be representative of any type of equipment carrier that is adapted to be secured to a vehicle using a hitch receiver such as 16.

Figure 2:
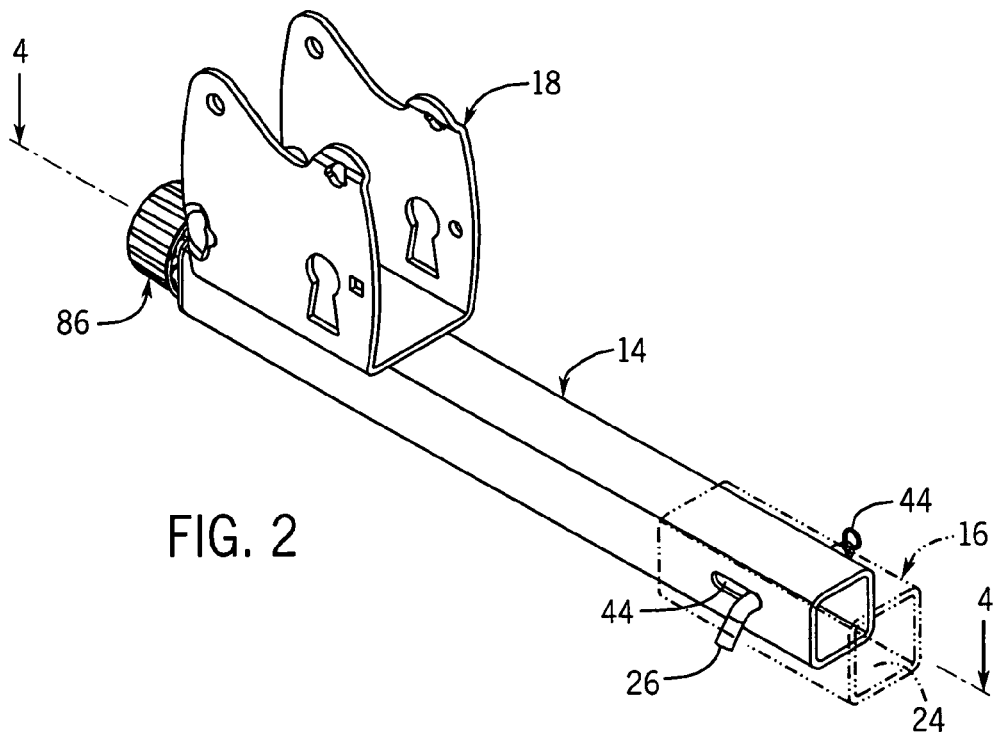
FIG. 2 is an isometric view showing the mounting member of the equipment carrier of FIG. 1, which incorporates the internal tightening system of the present invention for preventing relative movement between the mounting member and the hitch receiver.

FIG. 2 illustrates mounting member 14 of equipment carrier 10, to which bracket 18 is secured for use in maintaining support member 20 in engagement with mounting member 14. In a manner as is known, the inner end of mounting member 14 is configured to be received within a passage, shown at 24, defined by hitch receiver 16. Also in a known manner, hitch receiver 16 is in the form of a tubular member having aligned openings which are adapted to receive a hitch pin 26 is engaged with hitch receiver 16 and mounting member 14 for preventing axial movement of mounting member 14 relative to hitch receiver 16. As shown in FIG. 4, hitch receiver 16 is in the form of a tubular member that includes a pair of spaced side walls 28, and an opening 30 is formed in each side wall 28. Openings 30 are aligned, and hitch pin 26 extends through aligned openings 30. In addition, mounting member 14 has a tubular construction, including a top wall 32, a bottom wall 34, and a pair of side walls 36, 38, which cooperate to define an internal passage or interior 40. In the illustrated embodiment of equipment carrier 10, mounting bracket 18 is secured to top wall 32 of mounting member 14.

An opening 42 is formed in side wall 36 of mounting member 14, and is adapted to be placed into alignment with openings 30 in hitch receiver side walls 28. A slot 44 is formed in mounting member side wall 38, and defines an inner end area that is in alignment with hitch receiver openings 30 and opening 42 in mounting member side wall 36. With this construction, hitch pin 26 can be inserted through one of openings 30, the inner portion of slot 44, opening 42 and the other of openings 30, or vice versa, to prevent axial movement of mounting member 14 relative to hitch receiver 16. In a known manner, one end of hitch pin 26 is bent and the other end of hitch pin 26 includes an opening adapted to receive a retainer such as a cotter pin 46, which cooperate to maintain hitch pin 26 in engagement with hitch receiver 16 and mounting member 14. It is understood that this configuration of hitch pin 26 is representative and that any other satisfactory hitch pin or interlocking member may be employed, e.g. a hitch pin having an enlarged head. It is also understood that cotter pin 46 is representative of any satisfactory arrangement for maintaining hitch pin 26 in place, and that cotter pin 46 may be replaced with a device such as a lock or any other satisfactory retainer.

With the exception of slot 44, the configuration and operation of mounting member 14, hitch receiver 16 and hitch pin 26 are known in the art.

In accordance with the present invention, a tightening system or assembly for selectively preventing relative movement between mounting member 14 and hitch receiver 16 includes an engagement member or locking member, in the form of a cam 50, in combination with an actuator mechanism 52 that is operable to move cam 50 between an operative position and a release position, as will be explained.

As shown in FIGS. 3a and 4, cam 50 has a nose section 54 that defines a side edge 56 and an outer edge 58, which are oriented at an acute angle relative to each other. Nose section 54 further includes an upwardly extending upper boss 60 and a downwardly extending lower boss 62, which define respective upper and lower end surfaces 64, 66, that are spaced apart a distance slightly less than the distance between the inside surfaces of upper wall 32 and lower wall 34 of mounting member 14. The flat configuration of upper and lower surfaces 64, 66 cooperates with the flat inner surfaces of top and bottom walls 32, 34, respectively, of mounting member 14 so as to maintain cam 50 in a predetermined orientation within interior 40 of mounting member 14. It should be understood that the upper and lower surfaces of cam 50, as defined by upper and lower surfaces 64, 66 of bosses 60, 62, respectively, may also be defined by any other structure having upper and lower surfaces located adjacent the inside surfaces of mounting member 14. In the illustrated embodiment, cam 50 is oriented so as to lie in a generally transverse plane relative to the longitudinal axis of mounting member 14.

Cam 50 further includes an engagement section 70 opposite nose section 54, which defines an arcuate outwardly facing engagement surface 72. An actuator mounting section 74 is located between nose section 54 and engagement section 70, which includes an aperture 76 that extends in a direction generally perpendicular to the plane of cam 50. Aperture 76 extends inwardly from a recess 78 formed in cam 50, which is defined by a pair of recess walls 80, 82 that are oriented at an acute angle relative to each other, in combination with a lower wall that extends between recess walls 80, 82 and from which aperture 76 extends inwardly through cam 50 at the intersection of recess walls 80, 82. As shown in FIGS. 4 and 5, cam 50 is configured such that nose section 54 faces hitch pin 26, and such that the transverse dimension of cam 50 is slightly less than the distance between the inner surfaces of mounting member side walls 36 and 38, to enable cam 50 to be slidably movable within interior 40 of mounting member 14.

As also shown in FIGS. 3a and 4, actuator mechanism 52 includes an actuator rod 84, a manually operable control or input member in the form of a knob 86, and a sleeve 88 that interconnects actuator rod 84 and knob 86.

The majority of the length of actuator rod 84 extends along a longitudinal axis, and an inner end of actuator rod 84 is bent relative to the remainder of the length of actuator rod 84 so as to form a cam engagement section 90. In assembly, cam engagement section 90 is engaged within aperture 76 in actuator mounting section 74 of cam 50, so as to secure cam 50 to the inner end of actuator rod 84. A disc-type retainer 92 may be engaged with cam engagement section 90, so as to maintain engagement of actuator rod 84 with cam 50. In this manner, the inner end of actuator rod 84 located adjacent cam engagement section 90 is received within recess 78 in actuator mounting section 74 of cam 50.

The outer end of actuator rod 84 is formed with threads 94, which are preferably left handed threads. Sleeve 88 includes a threaded inner section 96 that defines a threaded passage within which threads 94 of actuator rod 84 are received. In addition, sleeve 88 includes an outer knob engagement section 98 that extends outwardly from inner section 96.

Knob 86 defines a receiver 100 having an inwardly open passage within which outer knob engagement section 98 of sleeve 88 is received. The passage of receiver 100 and outer knob engagement section 98 of sleeve 88 are formed to have mating non-circular cross-sections, such that rotation of knob 86 imparts rotation to sleeve 88. An opening is formed in the end wall of knob 86 so as to be in communication with the passage of receiver 100, and a connector, such as a screw 102, extends through the opening into a threaded passage that extends inwardly from the outer end of knob engagement section 98 of sleeve 88. In this manner, knob 86 is maintained in engagement with sleeve 88.

Inner section 96 of sleeve 88 is formed so as to have a transverse dimension greater than that of outer knob engagement section 98, to form an external shoulder 104 therebetween. An end plate 106 is secured to the outer end of mounting member 14, and includes a central opening 108. End plate 106 closes interior 40 of mounting member 14 at its outer end, and opening 108 is sized so as to enable outer knob engagement section 98 of sleeve 88 to extend outwardly through opening 104, while engaging shoulder 104 to maintain inner section 96 of sleeve 88 within interior 40 of mounting member 14. With this arrangement, knob 86, sleeve 88, actuator rod 84 and cam 50 are carried by mounting member 14. Knob 86 and outer knob engagement section 98 of sleeve 88 are located exteriorly of mounting member 14, whereas the remaining components, namely cam 50, actuator rod 84 and the inner section 96 of sleeve 88, are located within interior 40 of mounting member 14.

In operation, cam 50 and actuator mechanism 52 function as follows in order to prevent relative movement between hitch receiver 16 and mounting member 14.

Initially, as noted previously, the inner end of mounting member 14 is placed into internal passage 24 of hitch receiver 16, to align mounting member opening 42 and the inner area of mounting member slot 44 with hitch receiver openings 30, and hitch pin 26 is inserted therethrough in a transverse direction. Cam 50 is positioned so as not to interfere with insertion of hitch pin 26, such as is shown in the withdrawn or release position of FIG. 4.

Subsequent to insertion of hitch pin 26 as described, the user rotates knob 86 to impart rotation to sleeve 88. The threaded connection of actuator rod 84 with sleeve 88 extends actuator rod 84 relative to knob 86, to advance cam 50 toward hitch pin 26. During such rotation of knob 86, and thereby actuator rod 84, rotation of cam 50 within internal passage 40 of mounting member 14 is resisted by engagement of the upper surface of upper boss 60 with the inside upper surface of mounting member top wall 32, and engagement of the lower surface of lower boss 62 with the inside lower surface of mounting member bottom wall 34. Continued rotation of knob 86 causes nose section 54 of cam 50 to engage hitch pin 26 at the location at which hitch pin 26 extends through opening 42 in mounting member side wall 36, as shown in FIG. 5. Cam 50 is configured such that cam side edge 56 moves along the inside surface of side wall 36 during advancement of cam 50.

The user then continues to rotate knob 86, to further extend actuator rod 84 relative to sleeve 88. Because nose section 54 of cam 50 is engaged with hitch pin 26 and with the inside surface of mounting member side wall 36, such further extension of actuator rod 84 causes cam 50 to pivot in an arcuate path about nose section 54 to an operative position as shown in FIG. 6. Such pivoting movement of cam 50 is caused by engagement of nose section 54 with hitch pin 26 and with the inside surface of mounting member side wall 36, in combination with the pivot connection between cam 50 and actuator rod 84 that results from engagement of cam engagement section 90 of actuator rod 84 within aperture 76 in engagement section 70 of cam 50.

The pivoting movement of cam 50 from the inoperative position of FIG. 5 to the operative position of FIG. 6 is further enabled by the provision of slot 44 in mounting member side wall 38, through which engagement section 70 of cam 50 is moved as cam 50 is pivoted to the operative position of FIG. 6. Such movement of engagement section 70 through slot 44 results in engagement surface 72 of engagement section 70 coming into contact with the inside surface of hitch receiver side wall 28. Since nose section 54 of cam 50 is in engagement with mounting member side wall 36, the pivoting movement of cam 50 and the contact between engagement surface 72 and the inner surface of hitch receiver side wall 28 applies a transverse force to mounting member 14 that urges mounting member 14 laterally against the opposite hitch receiver side wall 28. The transverse force applied to mounting member 14 in this manner functions to prevent relative movement between mounting member 14 and hitch receiver 16, as long as cam 50 is maintained in the operative position.

It can thus be appreciated that the tightening system of the present invention utilizes hitch pin 26 as a member that provides leverage to enable cam 50 to be placed in the operative position so as to tighten mounting member 14 within hitch receiver passage 24. With this construction, the force applied to hitch pin 26 by cam 50 functions to maintain hitch pin 26 in position within the openings in mounting member 14 and hitch receiver 16. In addition, the use of hitch pin 26 to tighten mounting member 14 to hitch receiver 16 ensures that cam 50 can only be moved to the operative position if hitch pin 26 is properly in place and securely engaged with the walls of mounting member 14 and hitch receiver 16. In this manner, the tightening system of the present invention includes a failsafe feature, in that cam 50 cannot be moved to the operative position unless hitch pin 26 is properly in place and engaged with the walls of mounting member 14 and hitch receiver 16.

During operation of actuator mechanism 52 and cam 50, the walls 80 and 82 of recess 78 function to limit the range of movement of cam 50 relative to actuator rod 84. In this manner, cam 50 is prevented from moving to an over-center position relative to actuator rod 84, to ensure that cam 50 pivots to the operative position of FIG. 6 when nose section 54 of cam 50 is moved into engagement with hitch pin 26.

FIGS. 3B and 8 illustrate an alternative cam 120 that can be used in place of cam 50 in an embodiment adapted for use in combination with a smaller mounting member than mounting member 14 as shown and described. Representatively, mounting member 14 may be used for engagement with a standard hitch receiver having a nominal 2" square passage, and cam 120 may be used for a mounting member, shown at 122, that is dimensioned for engagement with a standard hitch receiver having a nominal 1¼" square passage. Actuator mechanism 52 may be used in combination with either cam 50 or cam 120.

Cam 120 also is generally wedge-shaped, and includes a nose section 124 that is configured similarly to nose section 54 of cam 50. In this embodiment, nose section 124 has a height that is only slightly less than the inside height of the passage of mounting member 122, to resist rotation of cam 120 upon rotation of knob 86 and sleeve 88, and during extension or retraction of actuator rod 84. Cam 120 includes a vertical aperture 126 within which cam engagement section 90 of actuator rod 84 is received, and aperture 126 extends inwardly from a recess defined by angled side walls 128, 130 and a bottom wall 132. In this version, retainer 92 is eliminated and the end of actuator rod 84 is located adjacent the inside surface of the lower wall of mounting member 122. Cam 120 further includes an arcuate engagement surface 134 that extends through a slot 136 in the side wall of mounting member 122 when cam 120 is pivoted to the operative position within the passage of mounting member 122, in the same manner as described previously with respect to cam 50, for engagement with the wall 28' of a hitch receiver 26'.

While the invention has been shown and described with respect to specific embodiments, it is understood that various alternatives and modifications are possible and are contemplated as being within the scope of the present invention. For example, and without limitation, which the invention has been shown with respect to cam 50 bearing against hitch pin 26 to provide leverage for moving cam 50 from the inoperative position to the operative position, it is also understood that cam 50 may be moved into contact with a surface protrusion or with any transverse member located within the interior of mounting member 14 for moving cam 50 from the inoperative position to the operative position. Any such structure need only be sufficient to stop advancement of cam 50 as cam 50 is moved forwardly by extension of actuator rod 84, and to maintain engagement of cam nose section 54 as cam 50 is pivoted about nose section 54 to the operative position. For example, a pin or rivet extending inwardly into the mounting member passage may be used to engage the forward end of the cam in place of the hitch pin. In addition, it is understood that the pivot connection between actuator rod 84 and cam 50 may have any other configuration than that which is shown and described, for pivoting cam 50 between the inoperative and operative positions upon extension of actuator rod 84. Further, the invention as shown and described provides guided movement of cam 50 within the interior of mounting member 14 by constructing cam 50 so as to extend across the space between the side walls of the mounting member. It is also contemplated that cam 50 may move within a slot formed in the upper and/or lower walls of the mounting member for guiding movement of cam 50 upon extension and retraction of actuator rod 84. It is further contemplated that cam 50 may be moved axially toward and away from the cross member, such as hitch pin 26, using any type of mechanism that is capable of moving cam member 50 within the interior of mounting member 14 and maintaining cam 50 in the operative position, in place of the threaded connection between actuator rod 84 and knob 86 as shown and described. For example, a cam lever may be used in place of knob 86 to provide axial movement of the actuator member to cause axial movement of the cam. Further, while cam 50 and the majority of the components of actuator mechanism 52 are shown as being contained in the interior of mounting member 14, it is also understood that such components may be exposed or located exteriorly of the mounting member with suitable adaptations.

It is also understood that, while the invention has been shown and described with respect to tightening a mounting member of an equipment carrier to the hitch receiver of a vehicle, the invention may also be used in many other applications. For example, and without limitation, another vehicular application involves incorporating the components of the tightening system in a trailer hitch that engages a trailer with the hitch receiver, to prevent sway and rattle of the trailer hitch relative to the hitch receiver. Other applications are possible, and include both vehicular applications as well as any other assembly which has one member that is slidably engaged within a passage defined by another member.

Various alternatives and embodiments are contemplated as being within the scope of the following claims particularly pointing out and distinctly claiming the subject matter regarded as the invention.

I claim:

1. A device for tightening a mounting member relative to a tubular receiver, wherein at least a portion of the mounting member is received within a passage defined by the tubular receiver, comprising:
   a cross member extending through an interior defined by the mounting member;
   an opening in the mounting member;
   an engagement member movably mounted within the interior of the mounting member; and
   an operating arrangement interconnected with the engagement member for imparting movement to the engagement member;
   wherein the operating arrangement and the engagement member are configured and arranged to move the engagement member between an operative position in which the engagement member bears against the cross member and extends through the opening in the mounting member into engagement with the receiver to urge an area of the mounting member against one or more internal surfaces defined by the receiver, and an inoperative position in which the engagement member is moved out of engagement with the receiver;
   wherein the mounting member defines a longitudinal axis and wherein the operating arrangement is carried by the mounting member, wherein the operating arrangement includes a manually rotatable input member secured to the mounting member for rotational movement about an axis of rotation generally parallel to the longitudinal axis of the mounting member, and an actuator member connected between the input member and the engagement member, wherein manual rotation of the input member causes the actuator member to pivot the engagement member between the operative and inoperative positions.

2. The device of claim 1, wherein the tubular receiver comprises a vehicle-mounted hitch receiver.

3. The device of claim 2, wherein the hitch receiver and the mounting member define aligned openings when the mounting member is positioned within the passage of the hitch receiver, and wherein the cross member comprises a pin that extends through the aligned openings in the hitch receiver and the mounting member for preventing withdrawal of the mounting member from the passage of the hitch receiver.

4. The device of claim 1, wherein the actuator member and the input member are interconnected via a threaded connection such that rotation of the input member causes axial movement of the actuator member that imparts movement to the engagement member for moving the engagement member between the operative and release positions.

5. A device for tightening a mounting member relative to a tubular receiver, wherein at least a portion of the mounting member is received within a passage defined by the tubular receiver, comprising:
   a cross member extending through an interior defined by the mounting member;
   an opening in the mounting member;
   an engagement member movably mounted within the interior of the mounting member; and
   an operating arrangement interconnected with the engagement member for imparting movement to the engagement member;
   wherein the operating arrangement and the engagement member are configured and arranged to move the engagement member between an operative position in which the engagement member bears against the cross member and extends through the opening in the mounting member into engagement with the receiver to urge an area of the mounting member against one or more internal surfaces defined by the receiver, and an inoperative position in which the engagement member is moved out of engagement with the receiver; and
   wherein the engagement member comprises a cam having first and second spaced apart areas that are configured such that, when the cam is in the operative position, the first area bears against the cross member and against an internal surface defined by the mounting member and the second area extends through the opening in the mounting member into engagement with the receiver.

6. The device of claim 5, wherein the operating arrangement is carried by the mounting member, and includes a manually operable input member secured to the mounting member, and an actuator member connected between the input member and the cam, wherein manual operation of the input member causes the actuator member to move the cam between the operative and inoperative positions.

7. The device of claim 6, wherein the cam includes limiting structure that interacts with the actuator member for limiting the range of movement of the cam between the operative and inoperative positions.

8. The device of claim 6, wherein the mounting member defines an outer end located exteriorly of the passage defined by the hitch receiver, wherein the input member is mounted to the outer end of the mounting member and wherein the actuator member comprises an axially extending actuator rod that extends through the interior of the mounting member.

9. The device of claim 8, wherein the input member is rotatably mounted to the outer end of the mounting member, and wherein the actuator rod and the input member are interconnected via a threaded connection such that rotation of the input member causes axial movement of the actuator rod that imparts movement to the cam for moving the cam between the operative and release positions.

10. The device of claim 9, wherein the cam includes engagement surfaces that interact with the mounting member to prevent rotation of the cam upon rotation of the input member.

11. A method of selectively securing a mounting member to a hitch receiver of a vehicle, wherein the hitch receiver defines a passage within which the mounting member is received, comprising the steps of:
   engaging a transverse member within an interior defined by the mounting member, by engaging a pin member with the mounting member and the hitch receiver through aligned openings defined by the mounting member and the hitch receiver when the mounting member is received within the passage of the hitch receiver; and
   applying a transverse force urging the mounting member into engagement with the hitch receiver, by engaging a locking member with the pin member, and resisting movement of the locking member in a first transverse direction while moving the locking member in a second transverse direction, opposite the first transverse direction, through an opening in the mounting member into engagement with a surface defined by the hitch receiver, wherein the locking member is configured such that movement of the locking member in the second transverse direction into engagement with the surface defined by the hitch receiver applies a transverse force to the mounting member in the first transverse direction that engages the mounting member with the hitch receiver.

12. The method of claim 11, wherein the step of resisting movement of the locking member in the first transverse direction is carried out by engaging a first portion of the locking member with the pin member and with an internal surface defined by the mounting member adjacent the opening in the mounting member through which the pin member extends.

13. The method of claim 12, wherein the step of moving the locking member in the second transverse direction is carried out by means of an actuator arrangement carried by the mounting member.

14. The method of claim 13, wherein the locking member comprises a cam having a first portion that engages the pin member and the internal surface of the mounting member to resist movement of the cam in the first transverse direction, and a second portion spaced from the first portion that is moved in the second transverse direction into engagement with the surface of the hitch receiver by operation of the actuator arrangement.

15. The method of claim 14, wherein the actuator arrangement includes an input member movably mounted to the mounting member and an actuator member interconnected between the input member and the cam, wherein operation of the actuator arrangement is carried out by manually engaging the input member at a location exteriorly of the mounting member.

16. The method of claim 15, wherein the step of moving the second portion of the cam into engagement with the internal surface of the hitch receiver is carried out by pivoting the cam in the second transverse direction via axial movement of the actuator member caused by operation of the input member.

17. The method of claim 16, wherein the cam includes limiting surfaces that interact with the actuator to limit movement of the cam relative to the actuator member.

18. The method of claim 16, wherein the input member is rotatably mounted to the mounting member, and wherein the input member and the cam are interconnected such that rotation of the input member causes axial movement of the actuator member.

19. The method of claim 18, including the step of engaging the cam with the mounting member to prevent rotation of the mounting member upon rotation of the input member.

20. The method of claim 18, wherein the step of manually engaging the input member is carried out so that the input member is rotated relative to the mounting member, wherein a threaded connection is interposed between the input member and the actuator member for causing axial movement of the cam.

21. A tightening arrangement for use with a mounting member configured for engagement within a passage defined by a vehicle-mounted hitch receiver that defines an internal passage, comprising:
  a pivotable engagement member carried by the mounting member, wherein the engagement member is located within an interior defined by the mounting member;
  a transverse surface located within the interior of the mounting member; and
  an actuator interconnected with the engagement member and with the mounting member, wherein the actuator is operable to pivot the engagement member between an operative position and a release position;
  wherein the engagement member is configured such that, when the engagement member is pivoted from the release position to the operative position, a first area of the engagement member engages the transverse surface and a second area of the engagement member extends into engagement with a surface defined by the receiver to apply a transverse force to the hitch receiver that urges the mounting member transversely into engagement with the hitch receiver, and such that, when the engagement member is pivoted from the operative position to the release position, the transverse force applied to the hitch receiver is relieved so as to relieve the force urging the mounting member transversely into engagement with the hitch receiver.

22. The tightening arrangement of claim 21, wherein the mounting member includes and opening, and wherein the engagement member moves through the opening in the mounting member into engagement with the hitch receiver.

23. The tightening arrangement of claim 22, wherein the actuator is axially movable and is interconnected with the engagement member via a pivot connection for pivoting the engagement member between the operative and release positions upon axial movement of the actuator.

24. The tightening arrangement of claim 23, wherein the actuator includes an input member that is secured to the mounting member, wherein a threaded connection is interposed between the input member and the actuator for providing axial movement of the actuator upon rotation of the input member to move the engagement member between the operative and release positions.

25. The tightening arrangement of claim 24, wherein the engagement member is configured to interact with the mounting member so as to prevent rotation of the engagement member relative to the mounting member upon rotation of the input member.

26. A tightening arrangement for use with a mounting member configured for engagement within a passage defined by a vehicle-mounted hitch receiver that defines an internal passage, wherein the hitch receiver and the mounting member define aligned openings, comprising:
  a pin member that extends through aligned openings in the hitch receiver and the mounting member for preventing relative axial movement between the mounting member and the hitch receiver;
  a movable engagement member interconnected with the mounting member; and
  an axially movable actuator interconnected with the engagement member and with the mounting member, wherein the actuator is interconnected with the engagement member via a pivot connection and is operable to move the engagement member between an operative position and a release position upon axial movement of the actuator;
  wherein the engagement member is configured such that, when the engagement member is in the operative position, a first area of the engagement member engages the transverse member and a second area of the engagement member extends into engagement with a surface defined by the receiver to apply a transverse force to the hitch receiver that urges the mounting member transversely into engagement with the hitch receiver, and such that, when the engagement member is in the release position, the transverse force applied to the hitch receiver is relieved so as to relieve the force urging the mounting member transversely into engagement with the hitch receiver;

wherein the mounting member defines an interior and wherein the engagement member is located within the interior of the mounting member and moves through an opening in the mounting member into engagement with the hitch receiver, wherein movement of the engagement member to the operative position functions to apply an axial force to the pin member that prevents withdrawal of the pin member from the openings in the hitch receiver and the mounting member.

27. A system for preventing movement of a mounting member relative to the hitch receiver of a vehicle, comprising:

a movable engagement member carried by the mounting member and located within an interior defined by the mounting member;

a transversely extending member located within the interior defined by the mounting member; and an actuator carried by the mounting member and interconnected with the engagement member, wherein the actuator, the mounting member and the engagement member are configured such that operation of the actuator moves the engagement member axially against the transversely extending member and laterally against the hitch receiver to apply a transverse force to the mounting member that urges the mounting member into engagement with the hitch receiver, wherein the mounting member defines a longitudinal axis and wherein the actuator includes a manually rotatable input member secured to the mounting member for rotational movement about an axis of rotation generally parallel to the longitudinal axis of the mounting member, and an actuator member connected between the input member and the engagement member, wherein manual rotation of the input member causes the actuator member to pivot the engagement member between the operative and inoperative positions.

28. The system of claim 27, wherein the mounting member includes a first wall having an opening and a second wall opposite the first wall, wherein the engagement member moves through the opening in the first wall into engagement with the hitch receiver for urging the second wall against an adjacent wall defined by the hitch receiver.

29. The system of claim 28, wherein the actuator is extendible and retractable and is pivotably interconnected with the engagement member such that extension and retraction of the actuator upon rotation of the input member is operable to pivot the engagement member into engagement with the hitch receiver when the engagement member is engaged with the transversely extending member.

30. A system for preventing movement of a mounting member relative to the hitch receiver of a vehicle, comprising:

a movable engagement member carried by the mounting member and located within an interior defined by the mounting member;

a transversely extending member located within the interior defined by the mounting member; and an actuator carried by the mounting member and interconnected with the engagement member, wherein the actuator, the mounting member and the engagement member are configured such that operation of the actuator moves the engagement member axially against the transversely extending member and laterally against the hitch receiver to apply a transverse force to the mounting member that urges the mounting member into engagement with the hitch receiver;

wherein the engagement member and the actuator are interconnected via a pivot connection, and wherein the engagement member and the actuator include limiting structure for limiting the range of pivoting movement of the engagement member relative to the actuator.

31. A system for preventing movement of a mounting member relative to the hitch receiver of a vehicle, comprising:

a movable engagement member carried by the mounting member and located within an interior defined by the mounting member, a transversely extending member located within the interior defined by the mounting member; and an actuator carried by the mounting member and interconnected with the engagement member, wherein the actuator, the mounting member and the engagement member are configured such that operation of the actuator moves the engagement member axially against the transversely extending member and laterally against the hitch receiver to apply a transverse force to the mounting member that urges the mounting member into engagement with the hitch receiver;

wherein the movable engagement member is movable within an interior defined by the mounting member by rotation of the actuator, and wherein the movable engagement member and the mounting member include adjacent surfaces that cooperate upon rotation of the actuator to prevent rotation of the movable engagement member so as to provide axial movement of the engagement member upon rotation of the actuator.

32. A method of selectively securing a mounting member to a hitch receiver of a vehicle, wherein the mounting member is associated with an equipment carrier that includes a support member extending upwardly from the mounting member, and wherein the hitch receiver defines a passage within which the mounting member is received, comprising the steps of:

engaging a transverse member within an interior defined by the mounting member; and applying a transverse force urging the mounting member into engagement with the hitch receiver, by engaging a locking member with the transverse member, and resisting movement of the locking member in a first transverse direction while moving the locking member in a second transverse direction, opposite the first transverse direction, through an opening in the mounting member into engagement with a surface defined by the hitch receiver, wherein the locking member is configured such that a pivoting movement of the locking member in the second transverse direction into engagement with the surface defined by the hitch receiver applies a transverse force to the mounting member in the first transverse direction that engages the mounting member with the hitch receiver, wherein the step of pivoting the locking member in the second transverse direction is carried out by means of an actuator arrangement carried by the mounting member, wherein the actuator arrangement is operable independently of the upwardly extending support member to cause movement of the locking member in the second transverse direction.

33. The method of claim 32, wherein the actuator arrangement includes an input member rotatably mounted to the mounting member and an actuator member interconnected between the input member and the locking member, wherein rotation of the actuator arrangement is carried out by manually rotating the input member at a location exteriorly of the mounting member.

34. The method of claim 33, wherein the step of moving the locking member into engagement with the internal surface of the hitch receiver is carried out by pivoting the locking member in the second transverse direction via axial movement of the actuator member caused by rotation of the input member.

35. The method of claim 34, including the step of engaging the locking member with the mounting member to prevent rotation of the mounting member upon rotation of the input member.

36. The method of claim 34, wherein a threaded connection is interposed between the input member and the actuator member for causing axial movement of the locking member in response to rotation of the input member.

* * * * *